(12) United States Patent
Court et al.

(10) Patent No.: US 8,233,242 B2
(45) Date of Patent: Jul. 31, 2012

(54) TOLERANCE RING WITH OVERLAPPING LAYERS

(75) Inventors: David Court, Somerset (GB); Andrew Robert Slayne, Bristol (GB)

(73) Assignee: Saint-Gobain Performance Plastics Rencol Limited, Bristol (GB)

( * ) Notice: Subject to any disclaimer, the term of this patent is extended or adjusted under 35 U.S.C. 154(b) by 1130 days.

(21) Appl. No.: 12/099,403

(22) Filed: Apr. 8, 2008

(65) Prior Publication Data

US 2008/0266717 A1    Oct. 30, 2008

Related U.S. Application Data

(60) Provisional application No. 60/913,740, filed on Apr. 24, 2007.

(51) Int. Cl.
*G11B 5/55* (2006.01)
*F16C 17/00* (2006.01)
*F16C 32/00* (2006.01)

(52) U.S. Cl. .................. 360/265.6; 360/265.5; 403/372

(58) Field of Classification Search ............... 360/265.2, 360/265.3, 265.4, 265.5, 265.6; 403/372
See application file for complete search history.

(56) References Cited

U.S. PATENT DOCUMENTS

| | | | | |
|---|---|---|---|---|
| 3,700,271 A * | 10/1972 | Blaurock et al. | ............. | 403/372 |
| 3,976,340 A * | 8/1976 | Pitner | ............. | 384/581 |
| 4,790,683 A * | 12/1988 | Cramer et al. | ............. | 403/372 |
| 6,411,472 B1 * | 6/2002 | Allsup | ............. | 360/265.7 |
| 6,480,363 B1 * | 11/2002 | Prater | ............. | 360/265.7 |
| 7,085,108 B1 * | 8/2006 | Oveyssi et al. | ............. | 360/265.2 |
| 7,118,181 B2 * | 10/2006 | Frear | ............. | 299/104 |
| 7,149,281 B2 * | 12/2006 | Lacherade et al. | ............. | 378/132 |
| 7,583,476 B2 * | 9/2009 | Hanrahan et al. | ............. | 360/265.6 |
| 2002/0097927 A1 * | 7/2002 | Lee et al. | ............. | 384/103 |
| 2003/0053260 A1 * | 3/2003 | Barina et al. | ............. | 360/265.6 |
| 2005/0185865 A1 * | 8/2005 | Agrawal | ............. | 384/106 |
| 2008/0267693 A1 * | 10/2008 | Court et al. | ............. | 403/14 |

FOREIGN PATENT DOCUMENTS

| | | | |
|---|---|---|---|
| DE | 2934271 | | 3/1981 |
| EP | 1498911 | | 1/2005 |
| EP | 1731783 | | 12/2006 |
| GB | 2069070 | | 8/1981 |
| JP | 2003247542 | | 9/2003 |
| JP | 2006105380 A | * | 4/2006 |
| JP | 2009299748 A | * | 12/2009 |
| WO | WO-9429609 | | 12/1994 |
| WO | WO-2004094852 | | 11/2004 |
| WO | WO-2008021890 | | 2/2008 |

OTHER PUBLICATIONS

"Tolerance rings" Engineering Magazine—Technical File, 92, Aug. 1981.
Giri L. Agrawal: "Foil air/gas bearing technology—an overview" ASME International Gas Turbine & Aeroengine Congress & Exhibition, Jun. 2, 1997-Jun. 5, 1997, pp. 1-11, New York.

* cited by examiner

*Primary Examiner* — Jefferson Evans
(74) *Attorney, Agent, or Firm* — Abel Law Group, LLP; Chi Suk Kim

(57) ABSTRACT

A tolerance ring (10) for providing an interference fit between inner and outer components (36, 50) is disclosed. The tolerance ring (10) comprises a deformable band wound to form a first layer (111) having a plurality of radially extending projections (12, 13, 15) around its circumference and an unformed second layer (110) which overlaps with the first layer. The second layer acts as a force diffuser to spread the forces transferred through the projections on to the inner or outer component.

20 Claims, 4 Drawing Sheets

TOLERANCE RING WITH OVERLAPPING LAYERS

FIELD OF THE INVENTION

The invention relates to apparatus comprising mating inner and outer components, which are mounted together using a tolerance ring. For example, the invention can be used for mounting an arm on a bearing to form a pivot.

BACKGROUND OF THE INVENTION

It is known to connect together mating inner and outer components using a tolerance ring. For example, a tolerance ring may be sandwiched between a shaft that is located in a corresponding bore formed in a housing, or it may act as a force limiter to permit torque to be transmitted between the shaft and the housing. The use of a tolerance ring accommodates minor variations in the diameter of the inner and outer components without substantially effecting their interconnection.

Typically, a tolerance ring comprises a band of resilient material, e.g. a metal such as spring steel, the ends of which are brought towards one another to form a ring. A strip of projections extends radially from the ring either outwardly or inwardly towards the centre of the ring. The projections can be formations, possibly regular formations, such as corrugations, ridges, waves or fingers. The band thus comprises an unformed region from which the projections extend, e.g. in a radial direction.

In use, the tolerance ring is located between the components, e.g. in the annular space between the shaft and bore in the housing, such that the projections are compressed between the inner and outer components. Each projection acts as a spring and exerts a radial force against the components, thereby providing an interference fit between them. Rotation of the inner or outer component will produce similar rotation in the other component as torque is transmitted by the ring. Likewise, linear movement of either component will produce similar linear movement in the outer component as linear force is transmitted by the ring.

If forces (rotational or linear) are applied to one or both of the inner and outer components such that the resultant force between the components is above a threshold value, the inner and outer components can move relative to one another, i.e. the tolerance ring permits them to slip.

Although tolerance rings usually comprise a strip of resilient material that is curved to allow the easy formation of a ring, e.g. by overlapping the ends of the strip, they may also be manufactured as an annular band.

During assembly of apparatus with an interference fit between components, a tolerance ring is typically held stationary with respect to a first (inner or outer) component whilst a second component is moved into mating engagement with the first component, thereby contacting and compressing the projections of the tolerance ring to provide the interference fit. The amount of force required to assemble the apparatus may depend on the stiffness of the projections and the degree of compression required. Likewise, the load transmitted by the tolerance ring in its final position and hence the amount of retention force provided or torque that can be transmitted may also depend on the size of the compression force and the stiffness and/or configuration of the projections.

One example of the use of a tolerance ring is in a hard disk drive (HDD) pivot mount, where the tolerance ring provides axial retention between a rotatable pivot shaft and an arm mounted thereon. In conventional pivot mounts, the tolerance ring provides an interference fit between the arm and a bearing mounted on the shaft. Typically the bearing comprises two pairs of races which are axially separated from each other by a spacer. Since the components in pivot mounts are very small and sensitive, the bearing is often protected by a surrounding sleeve (a "sleeved pivot"). The sleeve often has the spacer machined on its inner surface. In such arrangements the tolerance ring is sandwiched between the sleeve and the arm. Whilst sleeved pivots are less prone to damage and therefore are less likely to adversely affect hard disk drive performance, the precise machining required to form the spacer on the inner surface of the sleeve and the desire to use less material in the manufacture of pivot mounts has led to the introduction of sleeveless pivots.

In sleeveless pivots, the outer race of each part of races is exposed, and the spacer comprises an annular band located axially ("floating") between them. The spacer is held in place by an axial pre-loading force exerted on the bearing. In such arrangements the tolerance ring is located between the outer races of the bearing and the arm.

SUMMARY OF THE INVENTION

At its most general, the invention provides a tolerance ring configuration which can confer greater stability on a sleeveless pivot. Stability between the two pairs of races and spacer is desirable to provide consistent performance of the pivot.

This is achieved in the invention by a two-layer tolerance ring configuration. The two layers may comprise a first layer having radially extending projections, e.g. similar to conventional tolerance rings, and a second plain layer which can act as a transmitted force diffuser. The two layers may be formed from a single piece of material such that they overlap when the material is looped round to form a ring.

According to a first aspect of the invention, there may be provided a tolerance ring for providing an interference fit between an inner component and an outer component, the tolerance ring comprising a deformable band wound to form overlapping first and second layers, wherein the first layer has a plurality of radially extending projections around its circumference. The first layer may be radially inward or outward of the second layer. The second layer may thus act as a sleeve between the first layer and the inner or outer component. The second layer may be a smooth surface arranged to act as a force diffuser, i.e. it may spread the force transmitted through the projections of the first layer over the inner or outer component. In one embodiment, the second layer is an innermost layer which may form a sleeve around the inner component. The overlap between the first and second layers may be substantially complete when in use to provide an even effect around the tolerance ring.

Spreading the transmitted force over the inner or outer component permits a more even application of force between components, i.e. a more consistent interference fit, which can improve the stability of the assembled apparatus. Moreover, softer materials can be used for the inner and/or outer components because distributing the force can prevent the projections from causing indentations in the inner/outer component.

The projections on the first layer may extend inwardly or outwardly from a circumferential surface of the tolerance ring. Each projection may comprise a rounded ridge rising to and falling from a radial peak. There may be more than one circumferential series of projections, the series being axially spaced from each other. The projections may be arranged to target the areas where transmitted force is to be applied on the inner and/or outer component. In one embodiment the projections may include sets of axially spaced protuberances adjacent to axially elongate protuberances, the axial extent of the elongate protuberance corresponding to the axial extent of the spaced protuberances.

The band may be a resilient split ring, e.g. an open loop of material that is arranged to double wrap around the perimeter of the inner component. The projections on the first layer may be symmetrical with respect to the perimeter of the inner component, i.e. within the overlapping region. This arrangement may be particularly stable.

The inner and outer components may comprise a shaft that is receivable in a bore formed in a housing. The bore may extend fully through the housing or only extend partially through or into the housing. In one embodiment, the housing may be an arm for a hard disk drive and the shaft may be a pivot for that arm. The pivot may comprise a pair of bearings which are axially separated from each other by a spacer element. The spacer element and bearings may be arranged substantially contiguously to provide a smooth outer surface of the inner component for receiving the tolerance ring.

The projections may be arranged to transmit a force to an outer race of a respective bearing. The second layer may be interposed between the projection and outer race to spread the force footprint of the projection onto the outer race.

The inner layer of the first and second layer may have an outwardly flared axial edge arranged to guide the inner component into the centre of the band during assembly. Both layers may have a flared axial edge.

According to a second aspect of the invention, there may be provided apparatus comprising an inner component, an outer component which mates with the inner component, and a tolerance ring located between the inner and outer components, the tolerance ring comprising a band wound to form overlapping first and second layers, the first layer having radially extending projections around its circumference which are compressible between the inner and outer components. The second layer may be interposed between the projections on the first layer and the inner component. The second layer may be a smooth sheet arranged to diffuse the force transmitted via the projections onto the inner and/or outer components. The inner component may be composed on a plurality of axially adjacent sub-components. The projections may be arranged to target the transmitted force on respective sub-components, whilst the second layer may be arranged to spread the transmitted force to promote an even interference fit between the components. The inner component may be a pivot for a hard disk drive pivot mount, as discussed above.

Further aspects of the invention may include a method of assembling the apparatus according to the second aspect, and a pre-assembly comprising a tolerance ring according to the first aspect mounted on a shaft or within the bore of a housing.

BRIEF DESCRIPTION OF THE DRAWINGS

An embodiment of the invention is described below with reference to the accompanying drawings, in which.

DETAILED DESCRIPTION; FURTHER OPTIONS AND PREFERENCES

Figure 1:
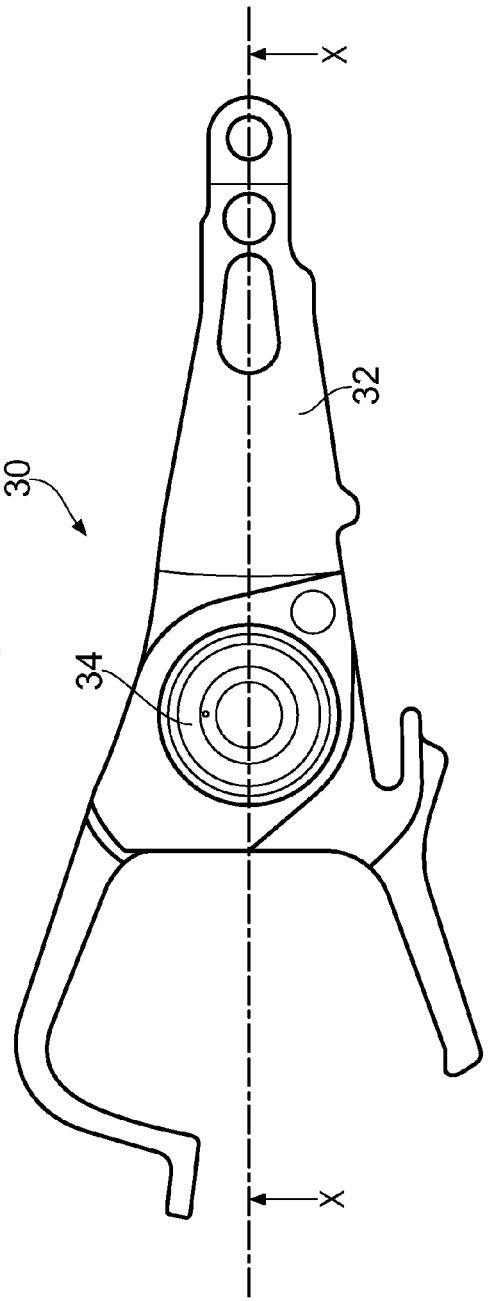
FIG. 1 shows a plan view of a conventional hard disk drive pivot mount which includes a tolerance ring.

FIG. 1 shows a known hard disk drive pivot mount 30, which comprises an arm 32 adapted to retain magnetic recording disks and pivot 34 which is rotatable on a bearing about a shaft. A tolerance ring (not shown in FIG. 1) provides an interference fit between the pivot 34 and the arm 32 such that the arm rotates with the pivot.

Figure 2:
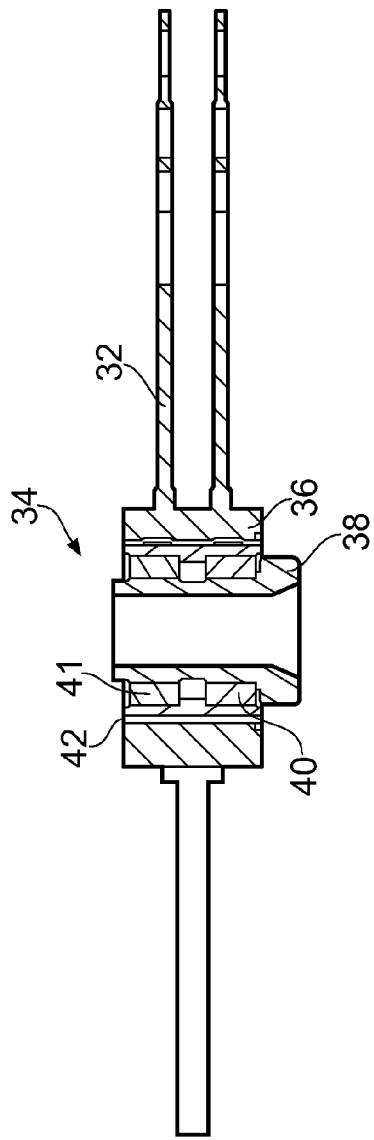
FIG. 2 shows a cross-section taken along the line X-X of the hard disk drive pivot mount shown in FIG. 1.

FIG. 2 shows a cross-section taken along the line X-X in FIG. 1. FIG. 2 shows that the arm 32 comprises a circumferential housing 36 which includes a bore in which the pivot 34 is received. The pivot 34 comprises a rotatable sleeve member 42 which is coupled to a shaft 38 via a pair of bearings 40, 41. FIG. 2 thus shows an example of a sleeved pivot. The tolerance ring fits between the outer surface of the rotatable sleeve member 42 and the inner surface of the bore formed in the circumferential housing 36. This is shown in more detail in FIG. 3, where it can be seen that a tolerance ring 20 having waves 28 substantially aligned with bearings 40, 41 is compressed between the rotatable sleeve member 42 and circumferential housing 36.

Figure 3:
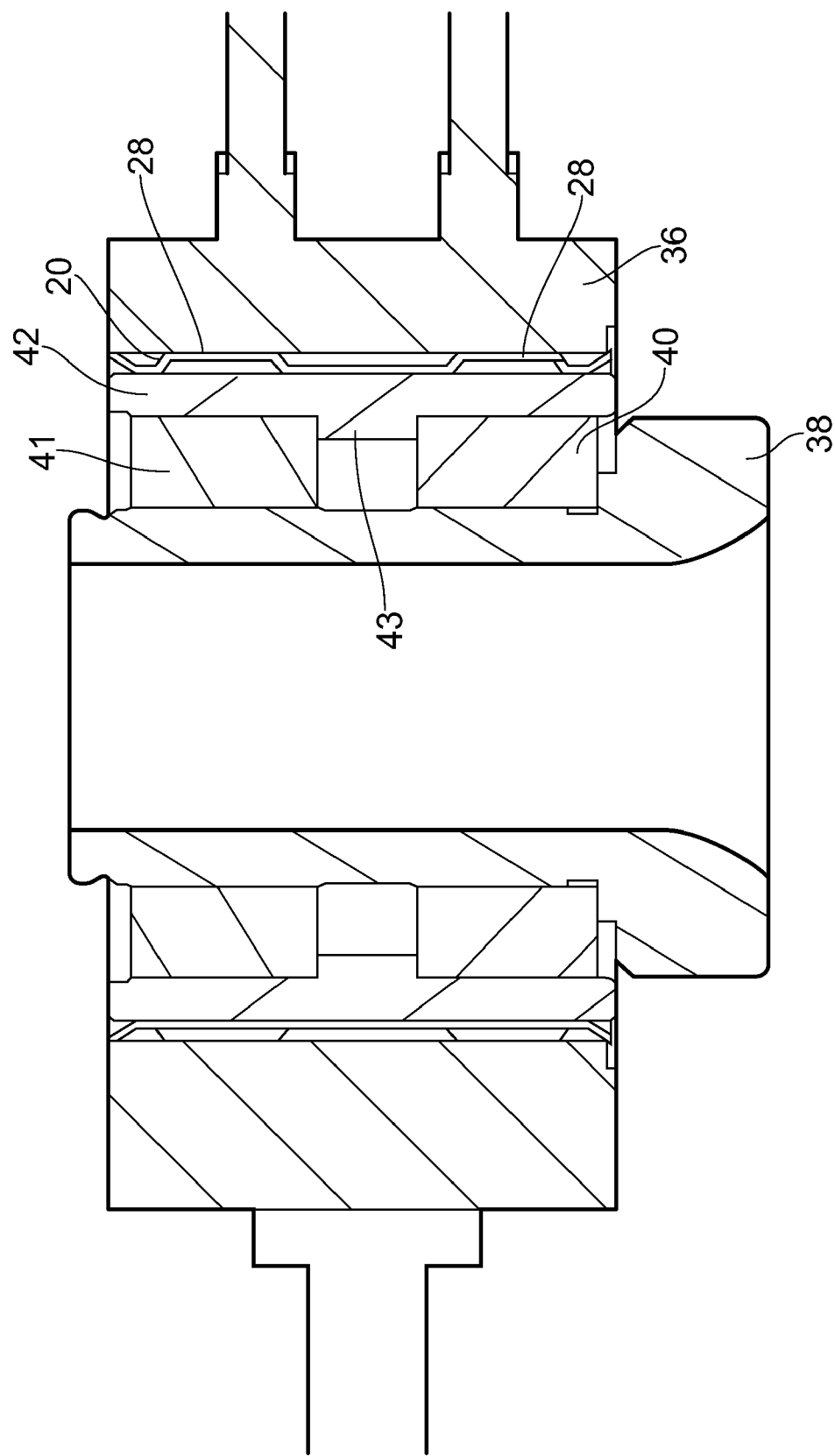
FIG. 3 shows a close-up of the coupling between the arm and sleeved pivot of the hard disk drive pivot mount shown in FIG. 1.

In FIG. 3 it can be seen that rotatable sleeve member 42 comprises an integral spacer element 43 which separates the bearings 40, 41.

Figure 4:
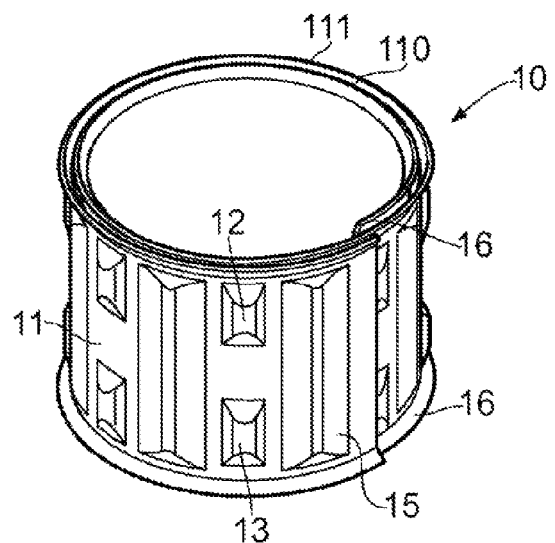
FIG. 4 shows a perspective view of a tolerance ring that is an embodiment of the invention.

FIG. 4 shows a tolerance ring 10 that is an embodiment of the invention. It is suitable for use with a sleeveless pivot, i.e. a pivot without a rotatable sleeve member, wherein the outer races of the bearings are exposed to and contact the tolerance ring. The tolerance ring comprises an annular band 11 of resilient material, e.g. spring (e.g. non-carbon) steel, which can be made by deforming a rectangular piece of material. The tolerance ring 10 may be sized for delicate assemblies, e.g. have a diameter of less than 16 mm and a sheet thickness of less than 0.2 mm.

In the embodiment, the band 11 is wound to form two overlapping concentric layers 110, 111, which form the circumferential wall of the tolerance ring 10. The length of the piece of material used to make the band 11 is chosen so that the circumferential ends of the band lie at substantially the same point on the perimeter of the band when in use, i.e. so that the overlapping layers 110, 111 substantially completely overlap with no gap or excess circumferential extension.

An outwardly flared flange 16 is provided around the top and bottom edge of the band 11 as a guide for an inserted shaft. In other embodiments, the flange 16 can be provided on only the top edge or only on the inner one of the overlapping layers 110, 111.

A first layer 111, which is the outermost overlapping layer in the embodiment shown in FIG. 4, includes a plurality of outwardly protruding waves 12, 13, 15 which act as radially extending projections. The waves 12, 13, 15 are compressible to provide an interference fit between inner and outer components (not shown), e.g. pivot and circumferential housing respectively in the example given above. Each wave 12, 13, 15 comprises a circumferentially extending rounded ridge rising to and falling from a radial peak. Each wave 12, 13, 15 tapers up to the peak from its axial edges.

The waves 12, 13, 15 form two types. The first type has a similar configuration to conventional waves (indeed, in other embodiments all of the waves may be of the conventional type). In the embodiment shown in FIG. 4, the first type of waves is represented by a plurality of sets of two axially spaced protuberances 12, 13. Each set (called a "duplex wave") comprises two identical waves located in an axial column on the circumference of the outer layer 111. There is a plurality of such sets around the circumference of the first (outer) layer 111. The second type of waves in the embodiment shown in FIG. 4 is represented by a plurality of axially elongate protuberances 15. The axial extent of each protuberance 15 corresponds to the axial extent of each set of axially spaced protuberances 12, 13 in that the outermost axial edges of the duplex waves 12, 13 and the elongate waves 15 lie on substantially the same circumference of the first (outer) layer.

A second layer 110, which is the innermost overlapping layer in the embodiment shown in FIG. 4, is a smooth regular surface which can act as a sleeve surrounding an inner component, e.g. a shaft received by the tolerance ring 10. The second layer 110 is therefore interposed between the first layer 111 (with projections 12, 13, 15) and the inner component.

Figure 5:
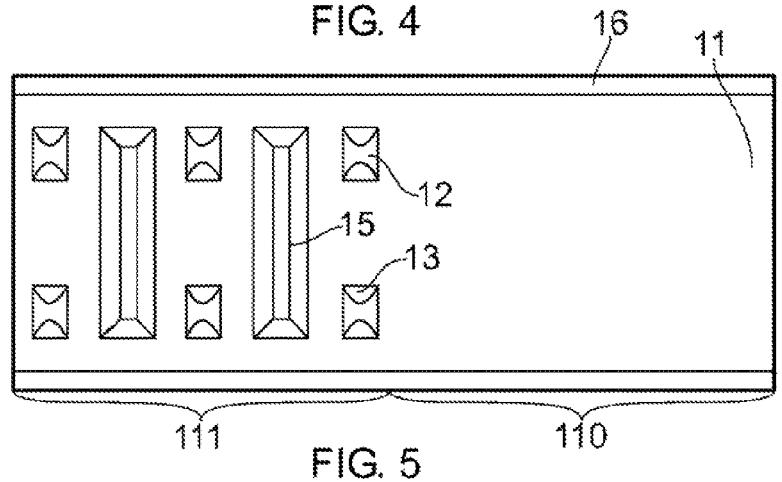
FIG. 5 shows a rectangular blank of material that can be used to form the tolerance ring of FIG. 4.

FIG. 5 shows a rectangular piece of material (a blank) which can be deformed to form a tolerance ring according to the invention. The rectangular piece of material comprises two adjacent regions which form the inner and outer layers 110, 111 respectively. Thus, the waves 12, 13, 15 are formed on one half of the blank while the outer half is left plain.

Figure 6:
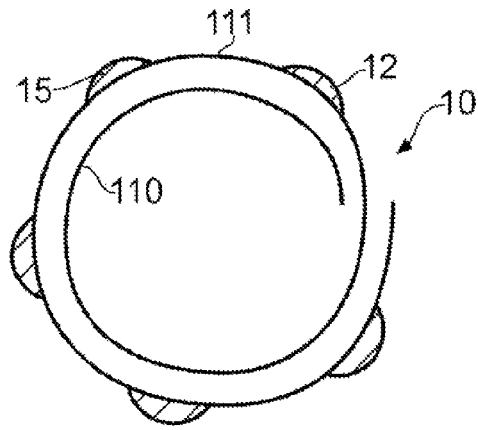
FIG. 6 shows a plan view of the tolerance ring of FIG. 4.
Figure 6A:
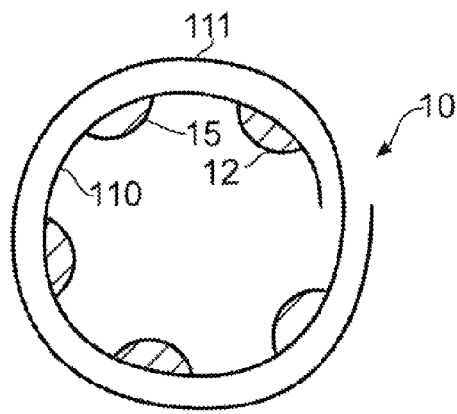
FIG. 6a shows a plan view of an alternative embodiment of a tolerance ring.

FIG. 6 shows a plan view of a tolerance ring 10 that is an embodiment of the invention. The concentric nature of the inner and outer layers 110, 111 is illustrated, and it can be seen that the inner layer 110 presents a smooth surface to the inner component (not shown). In another aspect, as illustrated in FIG. 6a, the inner layer 110 can be formed with one or more waves 12, 15.

Figure 7:
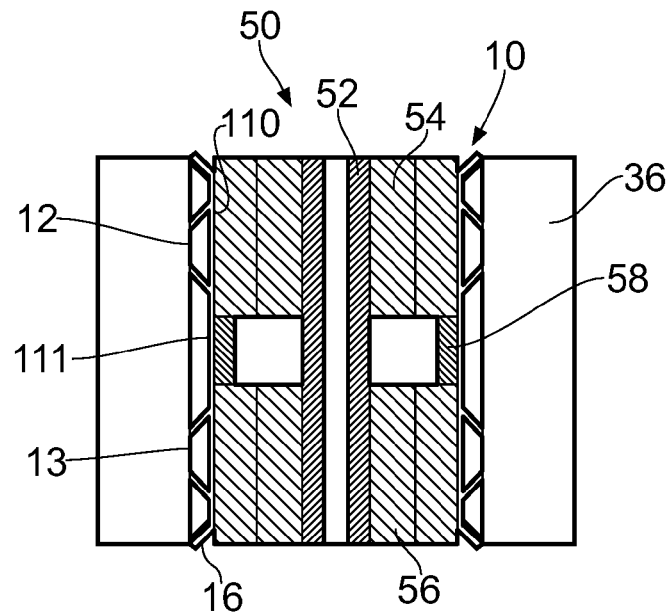
FIG. 7 shows a cross-section through a hard disk drive pivot mount having a sleeveless pivot which is another embodiment of the invention.

FIG. 7 shows a cross-sectional view of apparatus where the tolerance ring 10 discussed above is in use between a sleeveless pivot 50 and the circumferential housing 36 of an outer component e.g. an arm for a hard disk drive pivot mount. The sleeveless pivot comprises a hollow central shaft 52 with a pair of bearings 54, 56 attached thereto. The bearings 54, 56 are axially separated by an annular spacer element 58. The pivot 50 has no sleeve, so the outer race of each bearing 54, 56 and the spacer element 58 form the outer surface of the pivot 50. These components are not affixed to one another; they "float" in position under a preloading axial force that is applied to the inner race of the bearings 54, 56 when they are attached to the shaft 52. The tolerance ring 10 provides an interference fit by contacting (being compressed between) the outer surface of the pivot 50 and the inner surface of the circumferential housing 36.

FIG. 7 shows a cross-section through the apparatus at a position where there are two diametrically opposed duplex waves 12, 13 on the outer layer 111 of the tolerance ring 10. Each wave 12, 13 is substantially aligned with the outer race of a respective bearing 54, 56 to transmit the compression force to that bearing. It is important to transmit force to the bearings 54, 56 for stable operation and to decrease pivot torque. The inner layer 110 of the tolerance ring 10 is interposed between the outer layer 111 and the bearings 54, 56, thereby effectively acting as a sleeve for the pivot 50. The effect of the inner layer 110 of the transmitted force is explained with reference to FIGS. 8 and 9.

Figure 8:
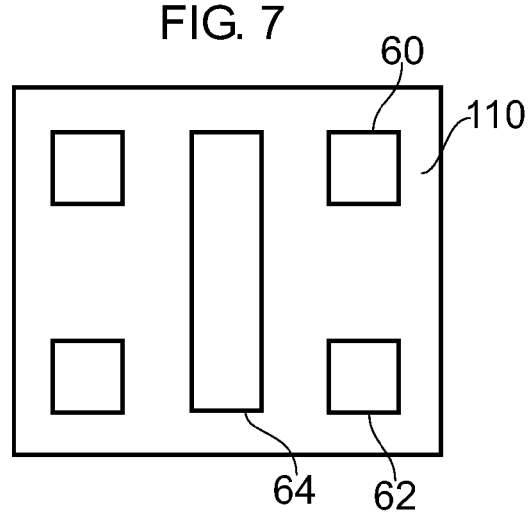
FIG. 8 is a schematic representation of a side view of the force footprint from a first layer of the tolerance ring on a second layer of the tolerance ring.

FIG. 8 shows a schematic view of the transmitted force footprint of the waves 12, 13, 15 onto the inner layer 110. FIG. 8 is a side view of the inner layer 110 with the force footprints superimposed. Footprints 60, 62 are from a duplex wave 12, 13 and are localised on regions corresponding to the respective bearings 54, 56. Footprint 64 is from an elongate wave 15 and extends axially down the inner surface 110. The footprints generally provide relatively sharp pressure regions along the areas where the waves 12, 13, 15 merge with the band 11.

Figure 9:
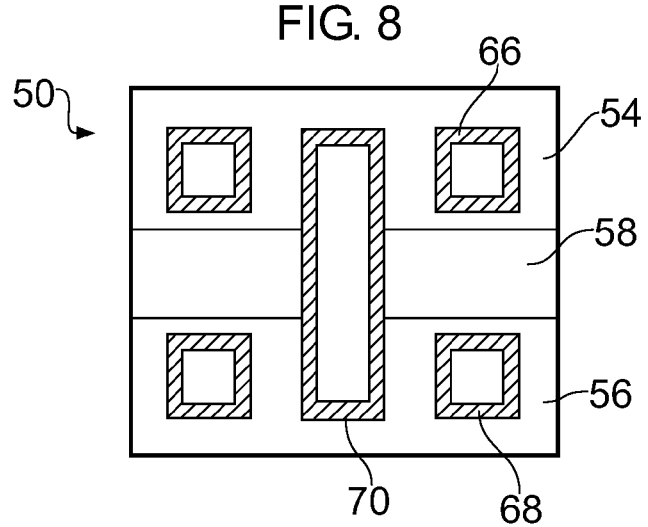
FIG. 9 is a schematic representation of a side view of the force footprint from the second layer of the tolerance ring on the outer surface of the pivot.

FIG. 9 shows a schematic view of the transmitted force footprint of the waves 12, 13, 15 onto the pivot 50. FIG. 9 is a side view of the pivot 50, which the outer races of the bearings 54, 56 and spacer element 58 exposed. The force footprints transmitted through the inner layer 110 onto the pivot 50 are superimposed. FIG. 9 shows how the inner layer 110 acts as a force diffuser to spread the forces over a larger area. Thus, force footprints 66, 68 from the duplex wave 12, 13 are still localised on the bearings 54, 56, but are more diffuse than the direct footprints experienced by the inner layer 110. Likewise, footprint 70, which bridges between the bearings 54, 56 across the spacer element to balance the forces acting on the pivot, is also more spread out than the corresponding direct footprint acting on the inner layer 110.

The invention claimed is:

1. A tolerance ring for providing an interference fit between an inner component and an outer component, the tolerance ring comprising a deformable band that is continuous and wound to form overlapping first and second layers, wherein the first layer has a plurality of radially extending projections around its whole circumference, each of which is overlapped by the second layer, and all projections on the first layer extend either inwardly or outwardly from an unformed portion of the first layer, wherein the deformable band further comprises a flared flange extending from an edge of the deformable band.

2. A tolerance ring according to claim 1, wherein the first layer is radially inward of the second layer.

3. A tolerance ring according to claim 1, wherein the first layer is radially outward of the second layer.

4. A tolerance ring according to claim 1, wherein the second layer is substantially unformed and the projections extend away from an unformed portion of the first layer.

5. A tolerance ring according to claim 1, wherein the band is a resilient split ring arranged to double wrap around the perimeter of the inner component.

6. A tolerance ring according to claim 1, wherein the flared flange extends outwardly.

7. A tolerance ring according to claim 1, wherein the deformable band include a top edge and a bottom edge and the flared flange extends from at least one of the top edge and the bottom edge.

8. A tolerance ring according to claim 1, wherein the flared flange extends along the entire length of the deformable band.

9. A tolerance ring according to claim 1, wherein the flared flange extends along an innermost layer of the overlapping first and second layers.

10. Apparatus comprising an inner component, an outer component which mates with the inner component, and a tolerance ring located between the inner and outer components, the tolerance ring comprising a band wound to form overlapping first and second layers, the first layer having radially extending projections around its whole circumference which are compressed between the inner and outer components and each of which is overlapped by the second layer, and the projections comprise a set of axially spaced protuberances adjacent to an axially elongate protuberance, the axial extent of the elongate protuberance corresponding to the axial extent of the set of spaced protuberance.

11. Apparatus according to claim 10, wherein the second layer is interposed between the projections on the first layer and the inner component.

12. Apparatus according to claim 11, wherein the second layer is a smooth sheet arranged to diffuse the force transmitted via the projections onto the inner component.

13. Apparatus according to claim 12, wherein the inner component comprises a plurality of axially adjacent sub-components.

14. Apparatus according to claim 13, wherein the inner and outer components comprise a shaft that is receivable in a bore formed in a housing.

15. Apparatus according to claim 14, wherein the housing is an arm for a hard disk drive and the shaft is a pivot for that arm, the pivot comprising a pair of bearings which are separated from each other by a spacer element, the spacer element and bearings being arranged substantially contiguously to form an outer surface of the inner component for receiving the tolerance ring.

16. Apparatus according to claim 15, wherein the second layer is interposed between the projections and outer races of the bearings to spread the force footprint of the projections onto the outer races.

17. Apparatus according to claim 10, wherein the first and/or second layer has an outwardly flared axial edge arranged to guide the inner component into the centre of the band during assembly.

18. A pre-assembly arrangement for an apparatus comprising an inner component, an outer component which mates with the inner component, and a tolerance ring located between the inner and outer components, the preassembly comprising a tolerance ring securely mounted either on a shaft or within a bore, wherein the tolerance ring comprises a deformable band wound to form overlapping first and second layers, wherein the first layer has a plurality of radially extending projections around its whole circumference, each of which is overlapped by the second layer, and the projections comprise a set of axially spaced protuberances adjacent to an axially elongate protuberance, the axial extent of the elongate protuberance corresponding to the axial extent of the set of spaced protuberance.

19. A method of assembling an apparatus comprising an inner component, an outer component which mates with the inner component, and a tolerance ring located between the inner and outer components, the method including:
    mounting a tolerance ring on either the inner or outer component, the tolerance ring comprising a deformable band wound to form overlapping first and second layers, wherein the first layer has a plurality of s radially extending projections around its whole circumference, each of which is overlapped by the second layer, and the projections comprise a set of axially spaced protuberances adjacent to an axially elongate protuberance, the axial extent of the elongate protuberance corresponding to the axial extent of the set of spaced protuberance; and
    mating the inner and outer components, thereby compressing the projections on the tolerance ring to provide an interference fit between the inner and outer components.

20. A tolerance ring for providing an interference fit between an inner component and an outer component, the tolerance ring comprising a deformable band that is continuous and wound to form overlapping first and second layers, wherein the first layer has a plurality of radially extending projections around its whole circumference, each of which is overlapped by the second layer, and all projections on the first layer extend either inwardly or outwardly from an unformed portion of the first layer, wherein the projections comprise a set of axially spaced protuberances adjacent to an axially elongate protuberance, the axial extent of the elongate protuberance corresponding to the axial extent of the set of spaced protuberances.

* * * * *